(12) United States Patent
DePaschoal

(10) Patent No.: US 8,665,332 B2
(45) Date of Patent: Mar. 4, 2014

(54) DEVICES TO EQUIP VEHICLES WITH CLOSE CIRCUIT TELEVISION BACKUP SYSTEM

(76) Inventor: Roberto DePaschoal, Windsor (CA)

(*) Notice: Subject to any disclaimer, the term of this patent is extended or adjusted under 35 U.S.C. 154(b) by 0 days.

(21) Appl. No.: 13/351,973

(22) Filed: Jan. 17, 2012

(65) Prior Publication Data

US 2012/0182422 A1    Jul. 19, 2012

Related U.S. Application Data

(60) Provisional application No. 61/461,352, filed on Jan. 18, 2011, provisional application No. 61/518,308, filed on May 4, 2011, provisional application No. 61/574,434, filed on Aug. 3, 2011.

(51) Int. Cl.
*H04N 7/18* (2006.01)
*B60R 1/00* (2006.01)

(52) U.S. Cl.
CPC ........................................ *B60R 1/00* (2013.01)

USPC ........................................................... 348/148

(58) Field of Classification Search
None
See application file for complete search history.

(56) References Cited

U.S. PATENT DOCUMENTS

| 5,927,341 | A * | 7/1999 | Taylor .............................. 138/98 |
| 7,176,958 | B2 * | 2/2007 | Jones ............................ 348/148 |
| 7,918,078 | B2 * | 4/2011 | Poggiagliolmi et al. ..... 56/340.1 |
| 2003/0234512 | A1 * | 12/2003 | Holub ........................... 280/432 |
| 2007/0182820 | A1 * | 8/2007 | Wang ............................ 348/148 |
| 2010/0073478 | A1 * | 3/2010 | Kalous ......................... 348/148 |

* cited by examiner

*Primary Examiner* — Nhon Diep
(74) *Attorney, Agent, or Firm* — Smiths IP

(57) ABSTRACT

A removable vehicle backup closed circuit television system for articulated vehicle trailers having a clamping device for instant securing or releasing of the rearward facing camera to the trailer. The clamp preferable is coupled to the trailer door's vertical locking rods.

15 Claims, 7 Drawing Sheets

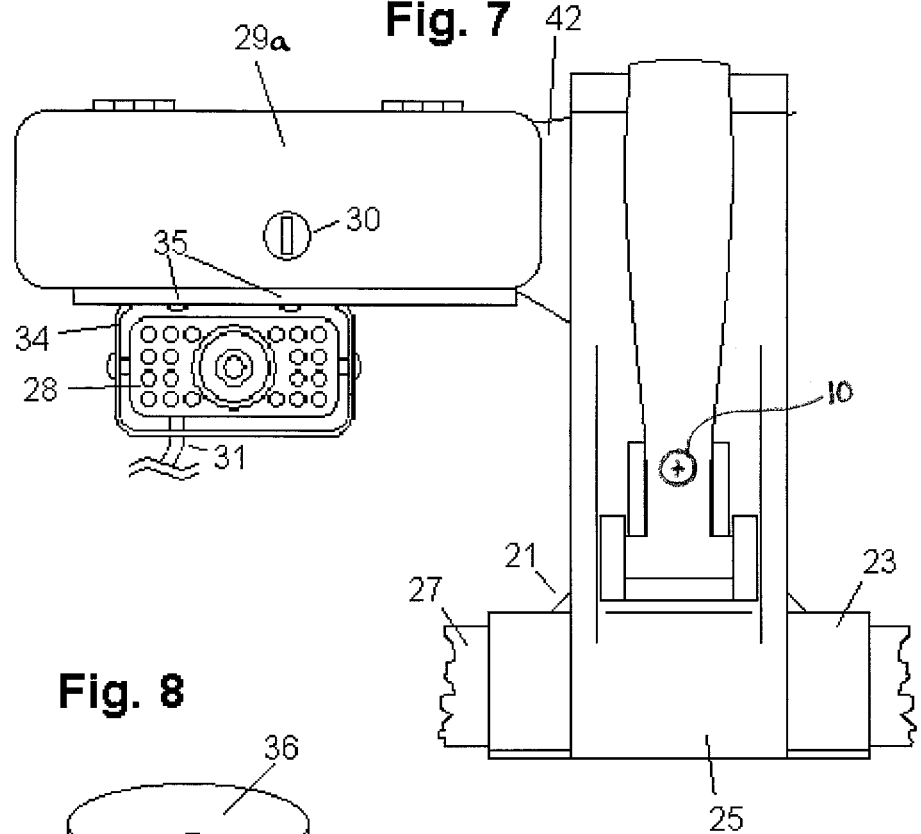
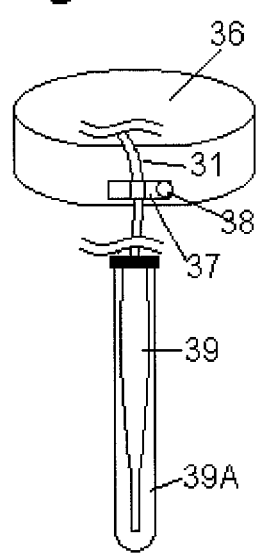
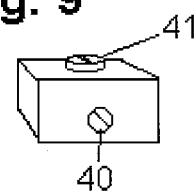

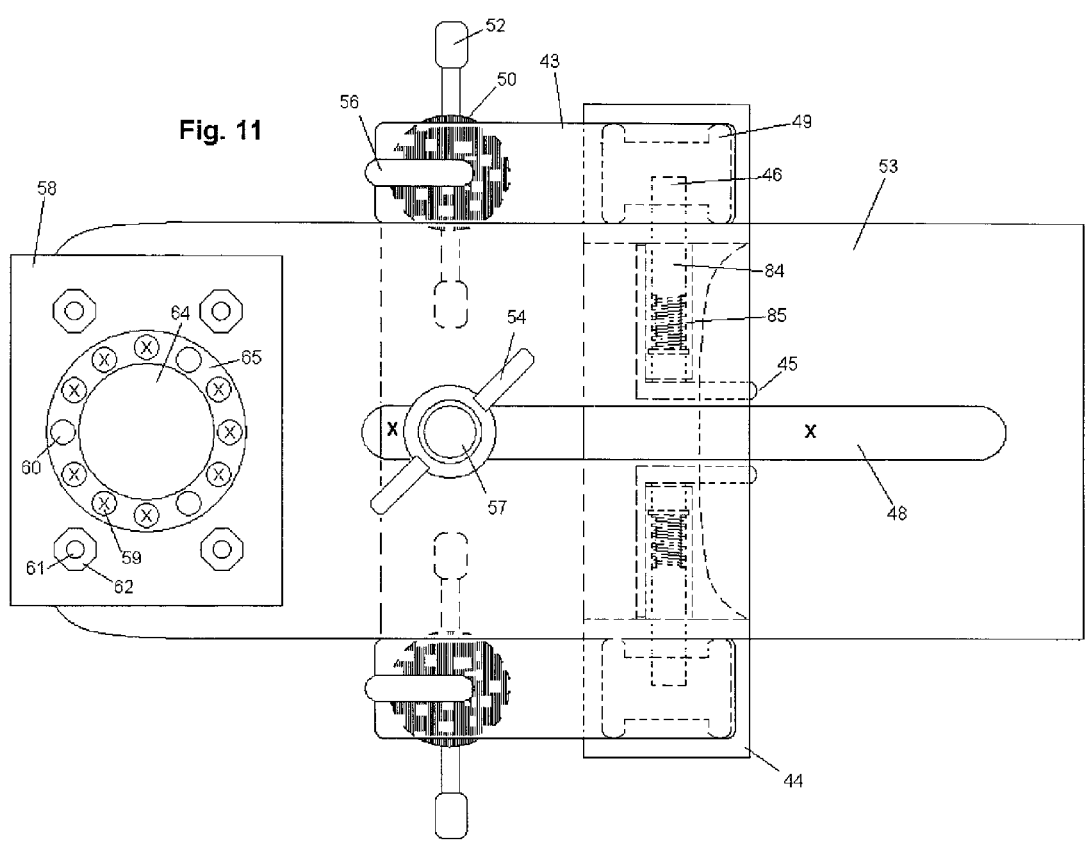

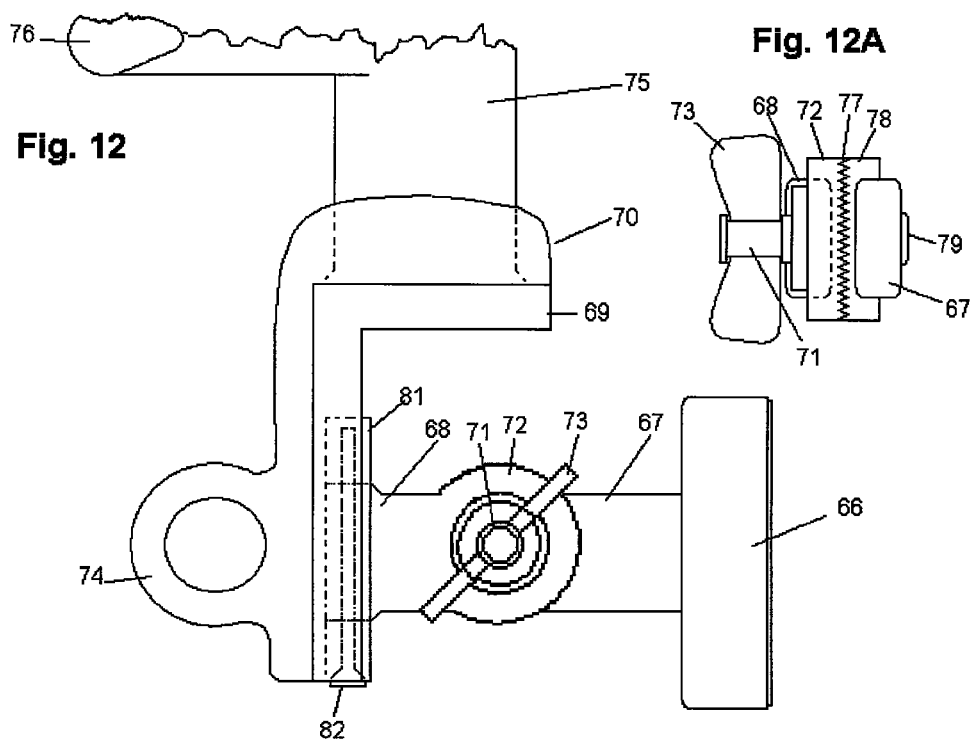
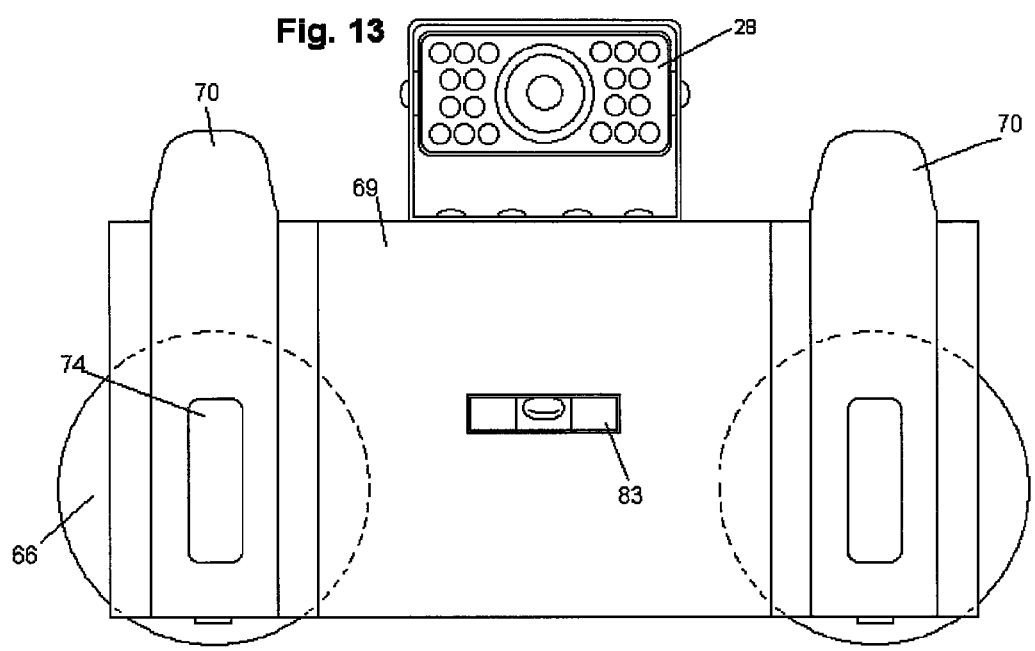

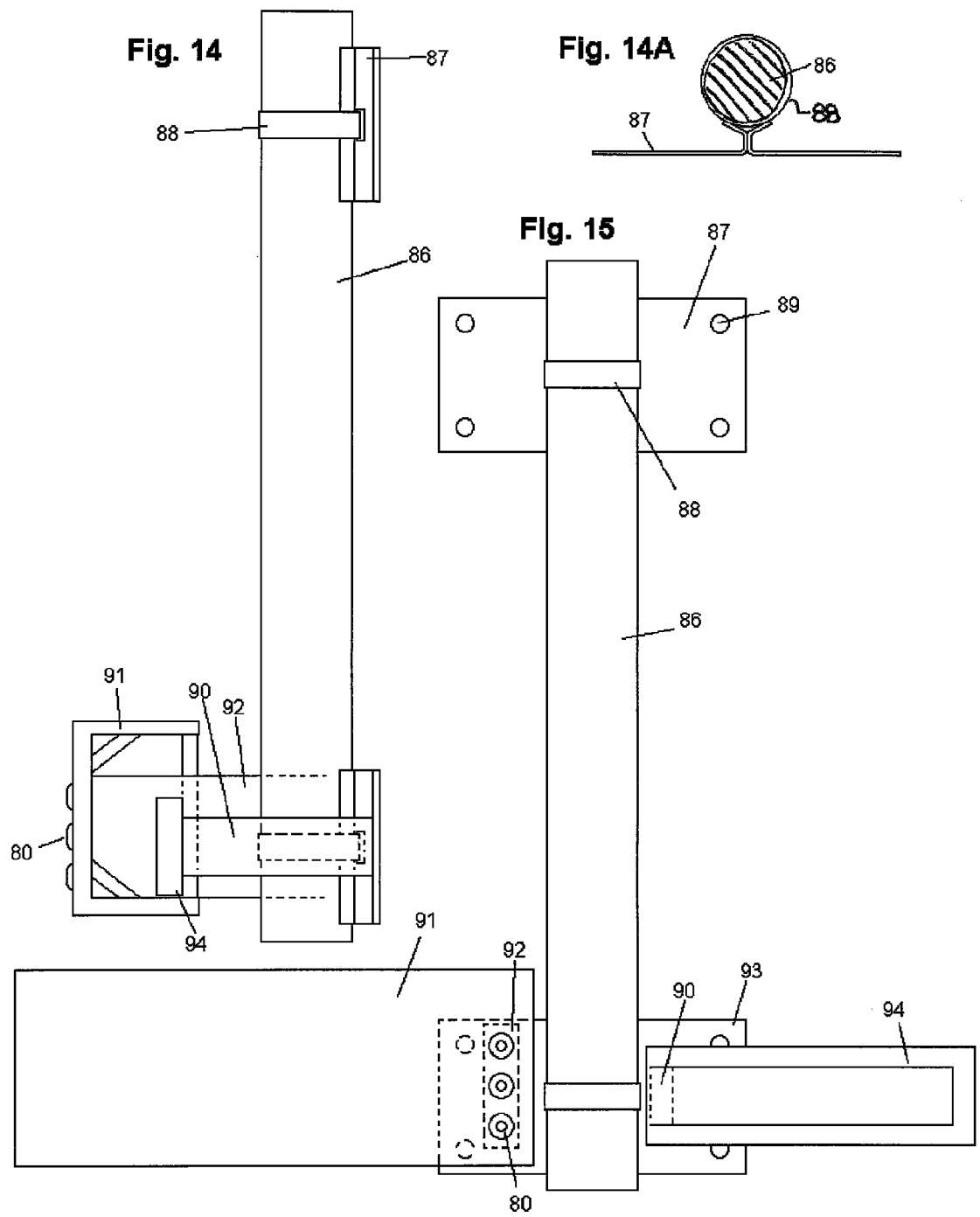

DEVICES TO EQUIP VEHICLES WITH CLOSE CIRCUIT TELEVISION BACKUP SYSTEM

CROSS REFERENCE TO RELATED APPLICATION

This application claims the benefit of the following the disclosures of which are expressly incorporated by reference herein: U.S. Provisional Patent Application Ser. No. 61/461,352, filed Jan. 18, 2011; U.S. Provisional Patent Application Ser. No. 61/518,308, filed May 4, 2011; and U.S. Provisional Patent Application Ser. No. 61/574,434, filed Aug. 3, 2011.

FIELD OF THE INVENTION

This invention is related to a system comprising a camera and monitor in wired or wireless communication with a monitor and a mounting mechanism to removably secure the camera to the rear of a vehicle.

BACKGROUND AND SUMMARY OF THE INVENTION

Currently, rearview cameras are readily available to passenger vehicles and to some fleet-based tractor trailers to greatly improve the driver's view behind the vehicle. Many tractor trailer drivers, such as "owner operators", cannot employ these cameras, however, because these drivers frequently haul different trailers. There is therefore a need for a stable, yet removable, fixture to mount a closed caption television camera (CCTV) upon substantially any type of large truck trailer. Because of this camera mobility, there is also the need to ensure that images captured by the camera are correctly provided to the driver of which ever vehicle the camera is mounted on, by providing adaptable communications between the CCTV and the specific display system provided in the vehicle.

The invention comprises of a CCTV removable system enabled by clamping devices for instant securing or releasing of apparatuses containing camera(s), wiring, optional antenna(s), power supply modules and other accessories to be attached at the very back of large vehicles and especially designed for the articulated ones, which have to be frequently coupled or uncoupled.

The camera, placed at the rear of the vehicle(s) may be conventionally wired to the TV monitor placed inside the cab of the truck through a long cable connecting each other. The system may, however, alternatively be done in a wireless manner with one or more transmitting the antenna(s) connected to the camera(s) and one or more receiving antennas attached to the very back of the tractor chassis and wired to the viewing monitor. For a straight truck version, the receiving antenna(s) may be alternatively installed somewhere else upon the vehicle. One major benefit of a wireless system is the opportunity to move the camera between vehicles, and to be able to recalibrate or re-synchronize it each time, to communicate properly with the monitor associated the particular vehicle on which the camera is mounted. An example of a suitable protocol under which the camera may be moved and re-synchronized to different display monitors is a Bluetooth® Secure Simple Pairing (SSP) protocol.

The transmitting antenna(s) may be placed close to the ground sending signals to the receiving one(s), installed also near the pavement for unobstructed wireless transmission within the ground clearance of the vehicle(s).

It will be understood that mentioned transmission could alternatively be done overhead, on the sides of the vehicles, etc., by providing appropriate hardware to hold the antennas in pertinent configurations.

In order to activate the system also when the tractor is not coupled to any trailer, there is another hardware device to be permanently installed on the back of the tractor, which may feature replicas of segments of the fixtures or mechanisms where the camera(s) and accessory devices would be alternatively clamped onto when at the back of the trailer or maritime container.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views, and in which:

FIG. 7 is a front view of the clamp of FIG. 5;

FIG. 8 is an exemplary view of a wireless camera antenna;

FIG. 9 is a plan view of a retention clip for retaining a camera wire along the length of a trailer;

FIG. 11 is a front view of the alternate embodiment of FIG. 10;

FIG. 12 is a side view of a magnet secured embodiment of the clamp of the invention;

FIG. 12A is an enlarged view of the angle adjustment feature of the embodiment of FIG. 12;

FIG. 13 is a front view of the embodiments of FIGS. 12 and 12A;

FIG. 14 is a side view of the bobtail-only mounting bracket;

FIG. 14A is a top view of the camera plate mounted to a vertical standard; and

FIG. 15 is a front view of the embodiment of FIGS. 14 and 14A.

DETAILED DESCRIPTION OF THE INVENTION

Figure 1:
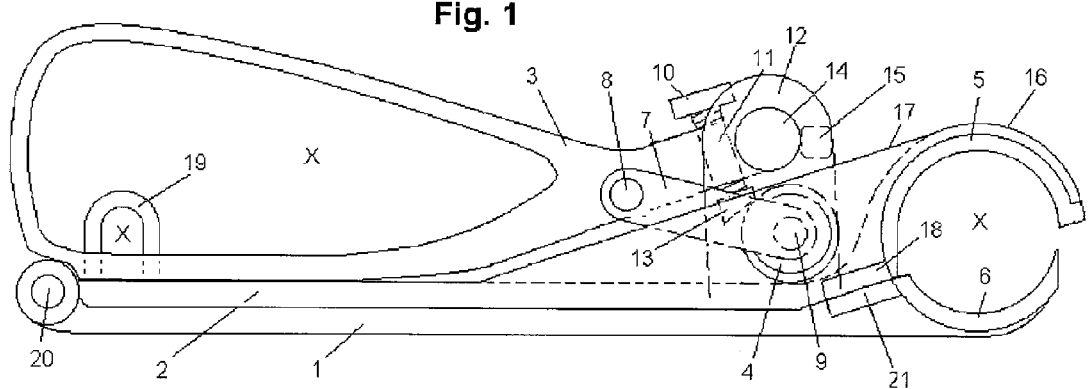
FIG. 1 is a side view of a first embodiment of the assembled camera clamp of the invention.
Figure 2:
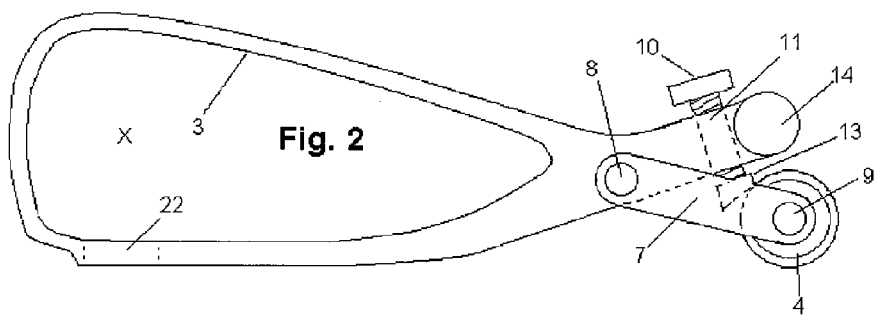
FIG. 2 is a detailed view of the locking swing handle of the clamp of FIG. 1.
Figure 3:
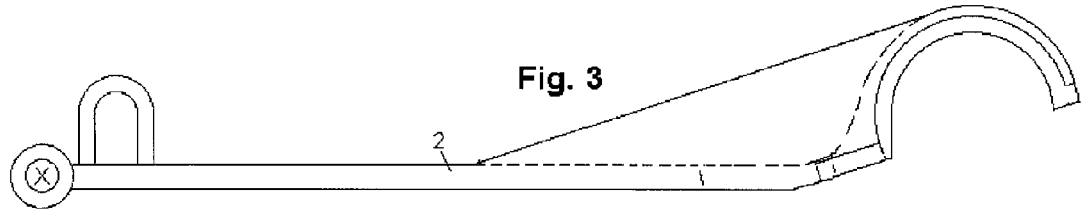
FIG. 3 is a side view of the upper plate of the clamp of FIG. 1.
Figure 4:
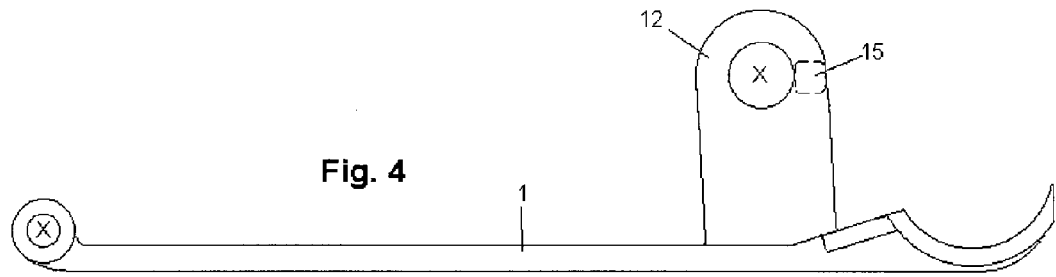
FIG. 4 is a side view of the lower plate of the clamp of FIG. 1.

Referring now to the FIGs., a preferred CCTV mounting system is illustrated and is divided in three components:

The clamping mechanism with a plate holding the camera (s) optional battery box and wiring for AND the transmitting antenna(s) to be installed at the very end of the vehicle(s).

The optional apparatus to be permanently attached to the back of the tractor's cab to be used whenever vehicle is not attached to any trailer (bobtailing). This item is obviously not applicable to straight trucks.

The receiver/monitor TV screen wired straight to the camera or alternatively to the receiving antenna(s) for wireless transmission.

There are four basic versions of systems for installing CCTV systems on commercial vehicles:

For trucks, trailers, maritime containers, intermodals, etc. with revolving vertical locking rods installed on hinged, swing type cargo doors, the snap-on/off securing mechanism may clamp horizontally onto the mentioned rods.

For trucks, trailers, cargo containers, etc., with rollup type cargo doors, which snap-on/off securing mechanism may clamp vertically onto the horizontal handle bar of those doors.

For trucks and trailers without any cargo door mechanisms to host the devices above mentioned, when the securing mechanism may be clamped onto the back of the D.O.T. rear bumper or any other rearmost area of the vehicle(s).

For vehicle carriers without any surface to be clamped onto, when the securing mechanism may have magnets to be attached to exposed face of the rearmost automobile or alternatively to the surrounding hardware whenever the trailer is unloaded.

Referring now to FIGS. 1-4 and 6, a preferred embodiment of the clamping device of the invention, is shown. The assembled device having two flat plates 1 and 2 hinged together at pivot pin 20 with jaws 5 and 6 that are configured to receive and grip the vertical locking rods of the above mentioned typical cargo doors. Plate 1 has two identical flat guide plates 12 protruding upwards and traveling through plate 2 which cooperatively define a yoke have round orifices for hosting the axles 14 which permit handle bar 3 to be rotatably coupled to the lower plate 1. The handle bar 3 protrudes outwardly and rotating on both sides in order to allow vertical swing motion of said bar. In one preferred embodiment, bar 3 also has a roller 4 for securing purposes, attached to a control arm 7 and secured by axles 8 and 9. Bolt 10 may penetrate a threaded hole 11 formed in handle bar 3, and may rotate to adjust the tension of the system by extending or retracting the central beam of "H" bar 13. In one non-limiting embodiment a transversal bar 15 may span the yoke formed by both plates 12 to hold these plates 12 in parallel alignment. A horseshoe-shaped loop 19 is installed onto plate 2 that may penetrate the slot of handle 3 shown on 22 of FIG. 2, where a padlock may be inserted through in order to prevent disengagement and theft of the equipment.

The upper jaw 16 on plate 2 may have a pair of reinforcing central surfaces or webs 17 which extends at an angle interconnecting the upper portion of jaw 16 to the plate 2. These support webs 17 run adjacent to the yoke plates 12. Similarly, reinforcing corner wedges 18 and 21 extend outwardly to support the elongated clamp jaws. In this manner, both plates 1 and 2 may have reinforcing material at the high stress area on and near the jaws.

Figure 5:
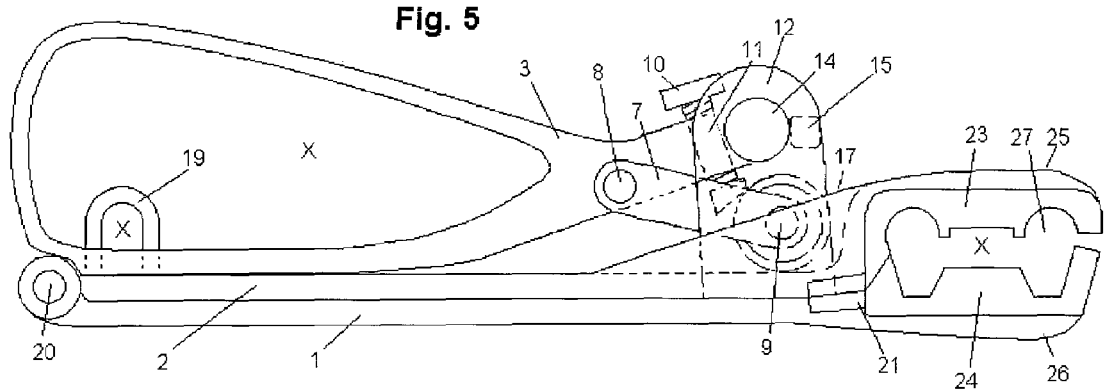
FIG. 5 is a side view of a second embodiment of the an alternate camera clamp of the invention.
Figure 6:
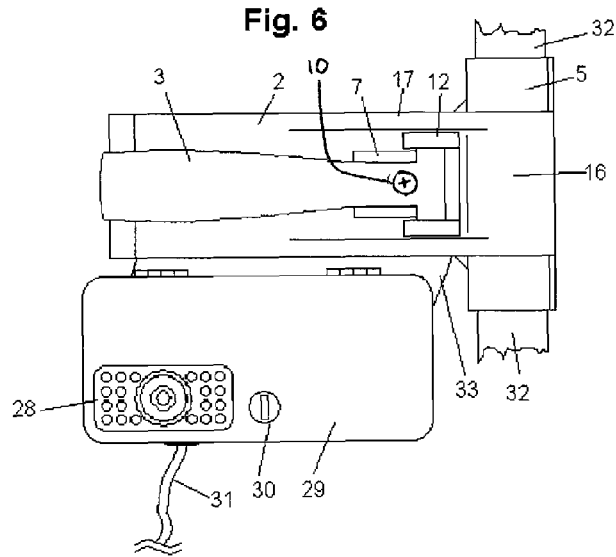
FIG. 6 is a front view of the clamp of FIG. 1, mounted to a trailer's locking rod.

Referring now to FIG. 5 a profile view of an alternate embodiment of the securing mechanism is shown. This embodiment is very similar to the one described above except for its different locking jaws, in this case is especially designed to be used on Whiting® models of door handles 27. Obviously other designs may be carried out for different configuration of handles. In this embodiment upper jaw 23, and lower jaw 24 both extend beyond the edges of the devices are the reinforcing surfaces 25 and 26, which are limited to the center area of the apparatus, as shown in FIG. 7. Like the first embodiment, the jaws are supported by reinforcing bracing such as corner reinforcing wedge 21. All other numbers may be similar to the ones of FIG. 1.

Referring back to FIG. 6 an upper view of the securing mechanism is illustrated installed on the vertical rod 32 of a cargo vehicle/trailer, showing the parts mentioned on FIG. 1, plus a mounting plate 33 which is coupled to the lower surface of plate 1 by conventional means, such as threaded fasteners.

Mounted to the plate 33 is a secure storage box 29 enclosing a conventional rearview CCTV camera 28, an optional battery, and the wiring connecting to the camera 28. The camera is contained within box 29 behind a transparent window located in the front wall of the box's casing and secured by a lock mechanism 30. The video camera may be connected to the monitor in the tractor's cabin in a wired version using cable 31, or alternatively using the same cable to a transmitting antenna placed nearby for wireless transmission.

Similarly, FIG. 7 illustrates is an upper view of the alternate embodiment of the securing mechanism installed on a Whiting® brand door handle 27, attached to the camera system by a plate 42, which holds a separate optional battery box 29a and a weather resistant CCTV camera 28 mounted on a frame 34 and secured via fasteners 35 to the support plate 42.

Referring now to FIG. 8, an optional magnet 36, which may be installed on rear bumpers of adjacent area, for wireless systems, which hold wire 31 stopped at tie 37, snapped in at 38, may connect camera 28 to a transmitting antenna 39. Antenna 39 may be protected from flying debris by a resilient removable enclosure 39A.

FIG. 9 shows one of the small blocks of magnet or any other material that may be used to secure the cable 31 (going through orifice 40 and tightened by tablet bolt 41) connecting a TV monitor in the vehicle's cabin for the driver's view, through the chassis to the receiving antenna installed at the rear end of the tractor, probably using also the device of FIG. 8 for hanging the antenna.

Figure 10:
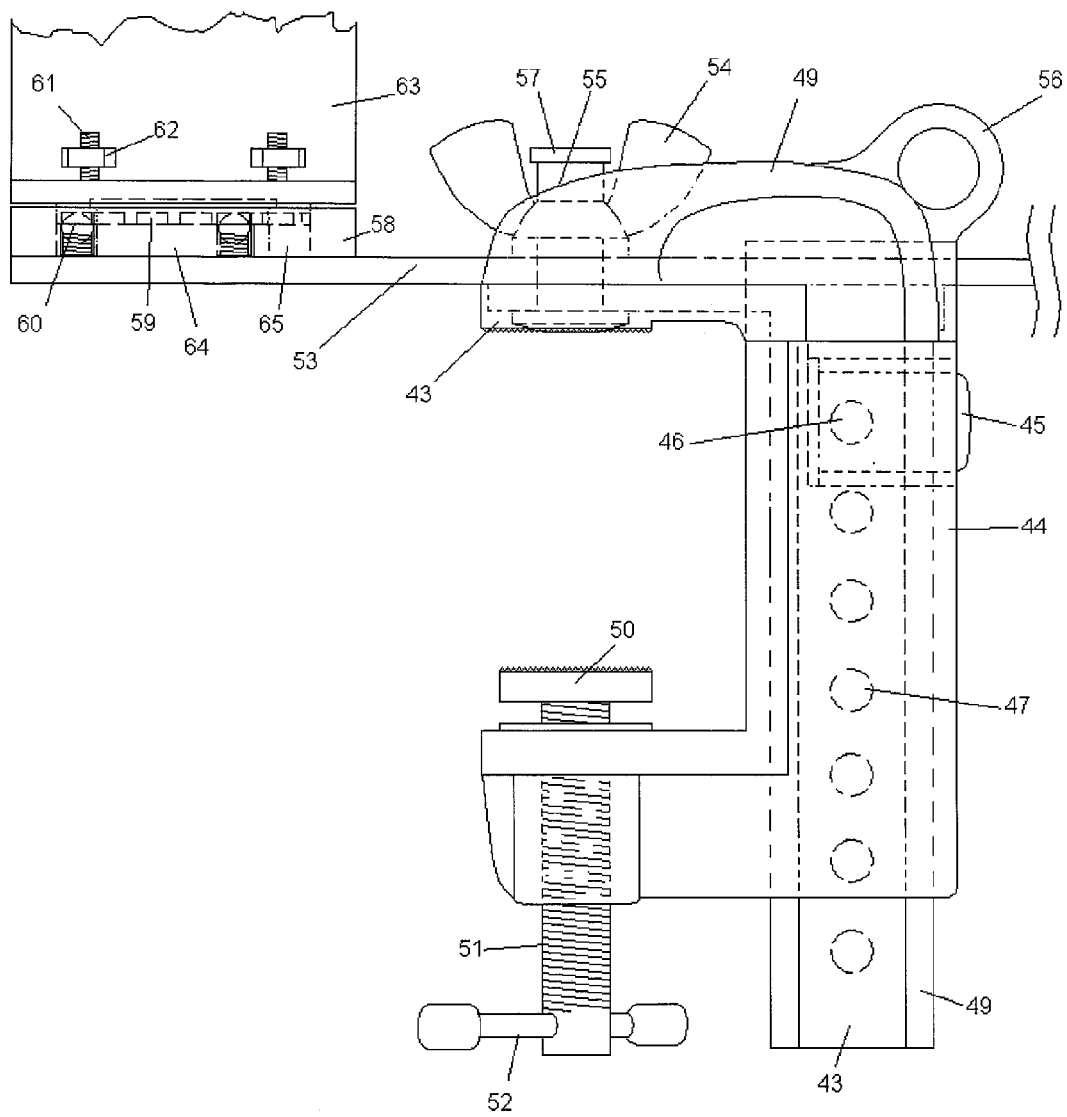
FIG. 10 is a side view of alternate embodiment of the clamp of the invention, having adjustable clamps.

FIGS. 10 and 11 show another alternate embodiment of the clamp portion of the invention, with the securing mechanism to be clamped onto the back of the rear bumper of trucks and trailers, which may be secured in between by a pair of "C-clamp" configured grippers having opposing upper jaws 43 and a rotary platform 50 which are rotated/tightened by bars 52 rotating around the thread 51. The clamp jaws are secured at body or frame 44, which may slide up and down elongated railings 43 whenever the securing mechanism is to be adjusted. For that purpose, levers 45 may be squeezed in releasing pins 46, which may stop, entering one of the slots 47 at the desired height. Protruding edges 49 may guide and reinforce the whole system between the sliding engagement of rails 43 and frame 44. There is also a flat plate 53 sliding in between the two jaws 43, which may adjust the lengthwise positioning of the camera system (retained by bracket 63) by the release of the wing-nut 54 rotating around the threaded shaft 55 and with a stopping crown 57. At least one loop 56 located on top of the edge 49 may be run through with a wire rope or similar security equipment attached to a padlock to prevent theft. At the other end, on top of plate 53 we may see the foundation for the camera/battery attachment, where base 58 may hold a carousel system that allows the camera, whose frame 63 may be secured by the bolts 61 and nuts 62, to turn sideways whenever desired. The system may rotate around round plate 64, where carousel 65 may have empty cups 59 which may be filled with spheres 60 with a spring expanding it to the top, thus, providing a natural click stop whenever desired level is reached. Additional aerodynamic equipment (cones, flaps, fairings, etc. not showing) may be installed on the apparatus in order to avoid droplets of water, snow or ice to interfere with quality of image provided by the camera(s).

As shown in FIG. 11, the twin adjustable clamps 43 with frame 44 moving up and down when tabs 45 are squeezed together and retracting the locking pins 84 out of the cavities 46. It may automatically click to the next stop by the force of the expanding spring 85. Plate 53 may be adjustable sideways by the release of the wing nut 54 traveling around 57, and sliding through the slot 48 and guided by the inner walls of 43.

58 is the pad where the camera/battery box may be installed upon, mounted through the bolts 61 and locked by the nuts 62. The side angle camera adjustment could be done by rotating the whole unit, around center core 64, making the balls 60 to skip cups 59 of carousel 65 until desired position is achieved.

Referring now to FIGS. 12, 12A and 13, another alternate embodiment is of the securing mechanism is illustrated, in this embodiment, the securing mechanism is especially configured for vehicle carriers with no surfaces to be clamped onto. In this case the system is attached magnetically to the very rearmost vehicle's body surface by magnet 66 which may be held by shaft 67 and 68 to the angle bar 69 of structure 70. In the embodiment illustrated in FIG. 12 an elongated pole 75 extends from the magnet-held angle plate 69 which is similar to the pole 86 of FIGS. 14 and 15 described below. In the embodiment illustrated in FIG. 13, the camera 28 and optional battery box (not shown) is mounted directly to the magnet-supported plate 69. Loops 74 provide for a wire rope to be inserted to prevent theft. Bubble 83 may help drivers to install the equipment in the right level.

FIG. 12A is a mechanism to give up-and-down adjustment and independent flexibility to legs 67, by releasing the wing-nut 73 which may turn around axle 71, secured at hub 79 and by the force of the inner expanding spring (not showing), the intermeshing teeth 77 may open and separate segments 72 and 78 allowing rotary movements to whatever desired notch, and then tightened nut 73 to secure that side of the unit. Legs 68/67 may also have sideways independent flexibility in between the hinges 81 and adjusted in tension by pin 82. All this flexibility is to adjust to the contour of various vehicles to be transported.

FIGS. 14-15 illustrate the "bobtail" mount portion the system, which may be attached permanently to the back of the tractors for alternatively host the camera system whenever there are no trailers attached thereto. Vertical standard or pipe 86 is configured to replicate the revolving locking rods of trailers and maritime containers to be clamped by the embodiment shown in FIGS. 1-4, and may be secured to plate 87 by clamp 88, and then bolted to the cabs through the holes 89. Bar 94 is a replica of the horizontal handle bar to be clamped onto by the mechanism of FIGS. 5 and 7, and it is attached to the component 2 by the solid bar 90. Bar 92 may hold the replica of a rear bumper 91, to be used by the version illustrated in FIGS. 10 and 11, which may be detached by the release of optional bolts 80.

FIG. 14A is an upper view of plate 87 holding pipe 86.

FIG. 15 is a front view of the system showing the pipe 86, handle 94, supported by bar 90, and bar 91 secured by block 92 and bolted by optional bolts 80. Plates 87 and 93 may be placed to the back surface of the tractor and bolted onto through the holes 89.

While the present invention has been described with particular reference to various preferred embodiments, one skilled in the art will recognize from the foregoing discussion and accompanying drawing and claims that changes, modifications and variations can be made in the present invention without departing from the spirit and scope thereof as defined in the following claims.

Having described my invention, I claim:

1. A securing mechanism to removably secure to a vehicle a removable closed circuit television backup system comprising a closed circuit television camera and: a monitor adapted to display an image from said camera; said securing mechanism comprising:
   a pair of clamp arms pivotally coupled together at a first end, each of said clamp arms comprising a gripping jaw at a second end;
   a locking handle pivotally mounted on said pair of clamp arms;
   a roller pivotally mounted to said handle, said roller abutting one of said clamp arms, wherein movement of said handle toward said clamp arms presses the gripping jaws together to secure the gripping jaws about an object; and
   a mounting plate coupled to one of said clamp arms to support said camera.

2. The securing mechanism as defined in claim 1, further comprising:
   a tensioning bolt passing through a threaded opening in said handle, wherein said bolt applies pressure upon said roller to adjust the grip pressure applied by the gripping jaws by extending and retracting said bolt from said handle.

3. The securing mechanism as defined in claim 2, further comprising a loop projecting from an upper surface of one of said clamp arms, the loop passing through an aperture in said handle when said handle is positioned adjacent to said clamp arm.

4. The securing mechanism as defined in claim 1, further comprising a secured storage box mounted to said mounting plate to accommodate said camera.

5. The securing mechanism as defined in claim 1, wherein said camera is in communication with said monitor by a wired connection.

6. The securing mechanism as defined in claim 1, wherein said camera transmits a wireless signal which is received by said monitor.

7. The securing mechanism as defined in claim 1, further comprising:
   a vertical support standard; and
   means for securing said support standard to a rearward portion of a vehicle;
   wherein said gripping jaws are removably coupled about said support standard.

8. The securing mechanism of claim 1 wherein:
   said vehicle is a trailer of a tractor-trailer vehicle, the trailer including at least one door at its rear and the door having at least one vertical locking rod running the door's height; and
   said gripper halves are concave shaped and are complementary in shape to said locking rod.

9. The securing mechanism as defined in claim 8, further comprising:
   a tensioning bolt passing through a threaded opening in said handle, wherein said bolt applies pressure upon said roller to adjust the grip pressure applied by the gripping jaws by extending and retracting said bolt from said handle.

10. The securing mechanism as defined in claim 9, further comprising a loop projecting from an upper surface of one of said clamp arms, the loop passing through an aperture in said handle when said handle is positioned adjacent to said clamp arm.

11. The securing mechanism as defined in claim 8, further comprising a secured storage box mounted to said mounting plate to accommodate said camera.

12. The securing mechanism as defined in claim 8, wherein said camera is in communication with said monitor by a wired connection.

13. The securing mechanism as defined in claim 8, wherein said camera transmits a wireless signal which is received by said monitor.

14. The securing mechanism of claim 1, further comprising a handle mounting yoke extending from a lowermost of said clamp arms, said yoke extending up through openings in an uppermost of said clamp arms to pivotally support said locking handle.

15. The securing mechanism of claim 8, further comprising a handle mounting yoke extending from a lowermost of said clamp arms, said yoke extending up through openings in an uppermost of said clamp arms to pivotally support said locking handle.

\* \* \* \* \*